(12) United States Patent
Shah et al.

(10) Patent No.: US 8,259,590 B2
(45) Date of Patent: Sep. 4, 2012

(54) SYSTEMS AND METHODS FOR SCALABLE AND RAPID ETHERNET FAULT DETECTION

(75) Inventors: Himanshu Shah, Hopkinton, MA (US); Ronald M. Parker, Boxborough, MA (US); Andrew Walker, Acton, MA (US)

(73) Assignee: Ciena Corporation, Hanover, MD (US)

( * ) Notice: Subject to any disclaimer, the term of this patent is extended or adjusted under 35 U.S.C. 154(b) by 625 days.

(21) Appl. No.: 11/962,366

(22) Filed: Dec. 21, 2007

(65) Prior Publication Data

US 2009/0161562 A1    Jun. 25, 2009

(51) Int. Cl.
*H04J 1/16* (2006.01)
(52) U.S. Cl. ........................................ 370/242
(58) Field of Classification Search .......... 370/216–228, 370/241–253
See application file for complete search history.

(56) References Cited

U.S. PATENT DOCUMENTS

| | | | | |
|---|---|---|---|---|
| 6,049,834 A * | 4/2000 | Khabardar et al. | ........... | 709/242 |
| 6,385,174 B1 * | 5/2002 | Li | ........... | 370/252 |
| 6,725,401 B1 * | 4/2004 | Lindhorst-Ko | ........... | 714/47 |
| 2005/0249123 A1 * | 11/2005 | Finn | ........... | 370/242 |
| 2006/0018263 A1 * | 1/2006 | McGee et al. | ........... | 370/241 |
| 2010/0208595 A1 * | 8/2010 | Zhao et al. | ........... | 370/242 |

OTHER PUBLICATIONS

Wikipedia. MAC address. Feb. 8, 2009. http://web.archive.org/web/20070208143757/http://en.wikipedia.org/wiki/MAC_address.*
S. Shah and M. Yip. Extreme Networks' Ethernet Automatic Protection Switching (EAPS) Version 1. RFC 3619. Network Working Group. Oct. 2003.*

* cited by examiner

*Primary Examiner* — Hassan Kizou
*Assistant Examiner* — Ashil Farahmand
(74) *Attorney, Agent, or Firm* — Clements Bernard PLLC; Christopher L. Bernard; Lawrence A. Baratta, Jr.

(57) ABSTRACT

The present invention provides scalable and rapid Ethernet fault detection which eliminates the requirement to contiguously send heartbeat frames at regular intervals to detect connectivity faults for each Ethernet Path. The present invention generates Continuity Check Message (CCM) frames only when a fault occurs, continues generating CCM frames while the fault remains, and discontinues when the fault clears. The present invention can be utilized with Ethernet Protection Switching to rapidly detect faults. Additionally, the present invention can be used in any Ethernet topology including point-to-point, rings, and the like.

18 Claims, 8 Drawing Sheets

SYSTEMS AND METHODS FOR SCALABLE AND RAPID ETHERNET FAULT DETECTION

FIELD OF THE INVENTION

The present invention relates generally to data communication networks, and more particularly, the present invention provides systems and methods for scalable and rapid Ethernet fault detection mechanisms which eliminate the requirement to contiguously send heartbeat frames at regular intervals to detect connectivity faults for each Ethernet Path.

BACKGROUND OF THE INVENTION

Data communication networks, such as transport, access, and aggregation networks, are built using Ethernet. Current Carrier Ethernet techniques use Connectivity Fault Management (CFM) as specified in ITU-T Recommendation Y.1731 "OAM functions and mechanisms for Ethernet based networks" and in IEEE 802.1ag "Connectivity Fault Management," both of which are incorporated in-full by reference herein. CFM provides Operations, Administration, and Management (OAM) mechanisms to detect Ethernet connection impairments between two end points. Currently, these mechanisms require that endpoint nodes send heartbeat Continuity Check (CC) frames at regular intervals to each other on an Ethernet path. A sustained interruption (e.g., preconfigured number of instances) by virtue of non-receipt of contiguous heartbeat frames at a receiver is considered a fault in the path from a transmitter to the receiver.

Disadvantageously, existing Ethernet OAM mechanisms require the endpoint nodes to send contiguous heartbeat frames, i.e. Continuity Check Message (CCM) frames, for each Ethernet path at regular intervals. In addition, to detect a fault within a 50 ms timeframe (i.e., a typical requirement in carrier networks) in order to fail-over to a protected path, the regular interval must be very short, such as on the order of every 3 ms. These techniques have scalability problems as the number of Ethernet paths increase between two end nodes. For example, these techniques consume processing resources at a node, consume bandwidth on the line, and the like.

BRIEF SUMMARY OF THE INVENTION

In various exemplary embodiments, the present invention provides scalable and rapid Ethernet fault detection which eliminates the requirement to contiguously send heartbeat frames at regular intervals to detect connectivity faults for each Ethernet Path. The present invention generates Continuity Check Message (CCM) frames only when a fault occurs, continues generating CCM frames while the fault remains, and discontinues when the fault clears. The present invention can be utilized with Ethernet Protection Switching to rapidly detect faults. Additionally, the present invention can be used in any Ethernet topology including point-to-point, rings, and the like.

In an exemplary embodiment of the present invention, a method for scalable and rapid Ethernet fault detection includes configuring a Maintenance Intermediate Point with Maintenance Entity End Point information; monitoring at the Maintenance Intermediate Point for a link fault on a link connection to adjacent nodes; initiating a transmission of a Continuity Check Message with a Remote Defect Indication set in a reverse direction of the link fault to the Maintenance Entity End Point responsive to detecting the link fault; and initiating a transmission of a Continuity Check Message with the Remote Defect Indication reset responsive to clearing of the link fault. Optionally, the method for scalable and rapid Ethernet fault detection further includes continuing transmission of the Continuity Check Message with the Remote Defect Indication set in the reverse direction of the link fault to the Maintenance Entity End Point while the link fault remains.

Alternatively, the method for scalable and rapid Ethernet fault detection further includes continuing transmission of the Continuity Check Message with the Remote Defect Indication reset after clearing of the fault for a period of time. Also, the method for scalable and rapid Ethernet fault detection can further include configuring a unicast Media Access Control address for the Maintenance Intermediate Point; initiating a distribution of configuration information to the Maintenance Intermediate Point through a Continuity Check Message; storing the configuration information at the Maintenance Intermediate Point; and utilizing the configuration information for initiating Continuity Check Messages. The link fault is detected by the Maintenance Intermediate Point through one of local port failure detection, IEEE 802.3ah mechanisms, operator-level Continuity Check Messages, and a combination thereof. Optionally, the method for scalable and rapid Ethernet fault detection further includes utilizing Ethernet Protection Switching to switch to a diverse path at the Maintenance Entity End Point responsive to detecting the link fault.

In another exemplary embodiment of the present invention, an Ethernet path configured for scalable and rapid Ethernet fault detection includes a first Maintenance Entity End Point; one or more Maintenance Intermediate Points interconnected to the first Maintenance Entity End Point; and a second Maintenance Entity End Point connected to the first Maintenance Intermediate Point through the one or more Maintenance Intermediate Points; wherein the one or more Maintenance Intermediate Points are configured for unsolicited Continuity Check Message generation to the first Maintenance End Point and the second Maintenance End Point responsive to detecting a local link fault. The unsolicited Continuity Check Message generation includes a transmission of a Continuity Check Message with a Remote Defect Indication set in a reverse direction of the local link fault to one of the first Maintenance Entity End Point and second Maintenance Entity End Point responsive to detecting the local link fault; and a transmission of a Continuity Check Message with the Remote Defect Indication reset responsive to clearing of the local link fault.

Optionally, the unsolicited Continuity Check Message generation further includes a continuing transmission of the Continuity Check Message with the Remote Defect Indication set in the reverse direction of the local link fault to one of the first Maintenance Entity End Point and second Maintenance Entity End Point while the local link fault remains. Alternatively, the unsolicited Continuity Check Message generation further includes a continuing transmission of the Continuity Check Message with the Remote Defect Indication reset after clearing of the fault for a period of time. Each of the one or more Maintenance Intermediate Points are configured with a unicast Media Access Control address for the first Maintenance Entity End Point and the second Maintenance Entity End Point; the first Maintenance Entity End Point and the second Maintenance Entity End Point are configured to distribute configuration information to each of the one or more Maintenance Intermediate Points through a Continuity Check Message; and each of the one or more Maintenance Intermediate Points are configured to store the configuration information and utilize the configuration information for initiating Continuity Check Messages.

The local link fault is detected by a Maintenance Intermediate Point of the one or more Maintenance Intermediate Points through one of local port failure detection, IEEE 802.3ah mechanisms, operator-level Continuity Check Messages, and a combination thereof. Optionally, the Ethernet path configured for scalable and rapid Ethernet fault detection further includes a diverse interconnection between the first Maintenance Entity End Point and the second Maintenance Entity End Point; wherein the diverse interconnection includes one of a second set of one or more Maintenance Intermediate Points interconnected between the first Maintenance Entity End Point and the second Maintenance Entity End Point and a direct connection between the first Maintenance Entity End Point and the second Maintenance Entity End Point; and the first Maintenance Entity End Point and the second Maintenance Entity End Point are configured to utilize Ethernet Protection Switching to switch to the diverse interconnection responsive to detecting the local link fault.

In yet another exemplary embodiment of the present invention, an Ethernet ring topology configured for scalable and rapid Ethernet fault detection includes a first Maintenance Entity End Point; a first set of one or more Maintenance Intermediate Points interconnected to the first Maintenance Entity End Point; and a second Maintenance Entity End Point connected to the first Maintenance Intermediate Point through the one or more Maintenance Intermediate Points; a second set of one or more Maintenance Intermediate Points interconnected to the first Maintenance Entity End Point and the second Maintenance Entity End Point through a diverse path; wherein the first set of one or more Maintenance Intermediate Points and the second set of one or more Maintenance Intermediate Points are configured for unsolicited Continuity Check Message generation to the first Maintenance End Point and the second Maintenance End Point responsive to detecting a local link fault.

The unsolicited Continuity Check Message generation includes a transmission of a Continuity Check Message with a Remote Defect Indication set in a reverse direction of the local link fault to one of the first Maintenance Entity End Point and second Maintenance Entity End Point responsive to detecting the local link fault; and a transmission of a Continuity Check Message with the Remote Defect Indication reset responsive to clearing of the local link fault. Optionally, the unsolicited Continuity Check Message generation further includes a continuing transmission of the Continuity Check Message with the Remote Defect Indication set in the reverse direction of the local link fault to one of the first Maintenance Entity End Point and second Maintenance Entity End Point while the local link fault remains. Alternatively, the unsolicited Continuity Check Message generation further includes a continuing transmission of the Continuity Check Message with the Remote Defect Indication reset after clearing of the fault for a period of time.

Each of the first set of one or more Maintenance Intermediate Points and the second set of one or more Maintenance Intermediate Points are configured with a unicast Media Access Control address for the first Maintenance Entity End Point and the second Maintenance Entity End Point; the first Maintenance Entity End Point and the second Maintenance Entity End Point are configured to distribute configuration information to each of the first set of one or more Maintenance Intermediate Points and the second set of one or more Maintenance Intermediate Points through a Continuity Check Message; and each of the first set of one or more Maintenance Intermediate Points and the second set of one or more Maintenance Intermediate Points are configured to store the configuration information and utilize the configuration information for initiating Continuity Check Messages. The local link fault is detected by a Maintenance Intermediate Point of the first set of one or more Maintenance Intermediate Points and the second set of one or more Maintenance Intermediate Points through one of local port failure detection, IEEE 802.3ah mechanisms, operator-level Continuity Check Messages, and a combination thereof. Optionally, the first Maintenance Entity End Point and the second Maintenance Entity End Point are configured to utilize Ethernet Protection Switching to switch between the first set of one or more Maintenance Intermediate Points and the second set of Maintenance Intermediate Points responsive to detecting the local link fault.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides scalable and rapid Ethernet fault detection which eliminates the requirement to contiguously send heartbeat frames at regular intervals to detect connectivity faults for each Ethernet Path. The present invention generates Continuity Check Message (CCM) frames only when a fault occurs, continues generating CCM frames while the fault remains, and discontinues when the fault clears. The present invention can be utilized with Ethernet Protection Switching to rapidly detect faults. Additionally, the present invention can be used in any Ethernet topology including point-to-point, rings, and the like.

Advantageously, the present invention significantly reduces processor and memory resources at end nodes using Ethernet OAM mechanisms to detect faults in Ethernet paths. In addition, a significant amount of bandwidth savings is achieved by eliminating the need for transmitting CCM frames contiguously. Accordingly, network operators can enable fault detection for every Ethernet path without having to worry about line cost and decreased performance of Ethernet devices. For equipment vendors, this eliminates the requirement to include hardware to support large number of Ethernet OAM sessions.

Figure 1:
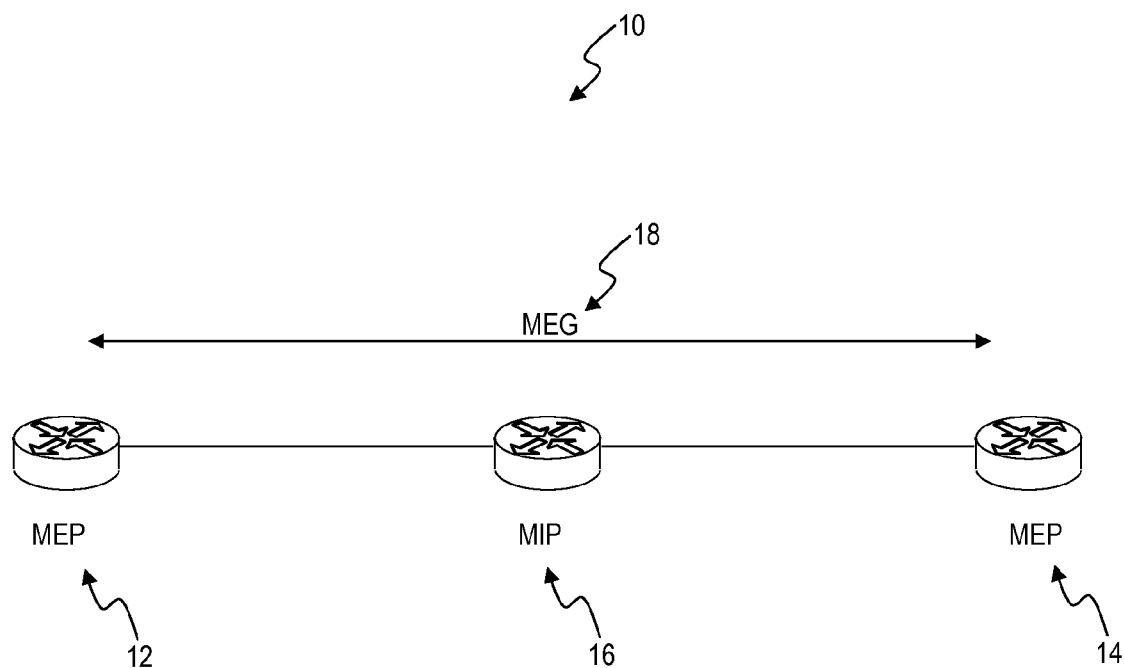
FIG. 1 is a reference Ethernet path configured with Ethernet OAM mechanisms according to an exemplary embodiment of the present invention.

Referring to FIG. 1, a reference Ethernet path 10 configured with Ethernet OAM mechanisms is illustrated according to an exemplary embodiment of the present invention. The reference Ethernet path 10 includes three interconnected routers/switches 12,14,16. The routers/switches 12,14 are defined as a Maintenance Entity End Point (MEP). An MEP is configured to source and sink CFM frames, such as CC frames. In a point-to-point network, there are two MEP nodes at the endpoints, and in a local area network (LAN) configuration, there can be multiple MEP nodes.

The router/switch 16 is defined as a Maintenance Intermediate Point (MIP) which resides between MEPs. A MIP is configured to process and forward CFM frames, but does not initiate CFM frames. As described herein, MEP and MIP terminology is used for nodes present at endpoints and intermediate points, respectively, in an Ethernet Path. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE) and the like, are also contemplated by the present invention.

Additionally, the routers/switches 12,14,16 are configured in a Maintenance Entity Group (MEG) 18 which enable a grouping of nodes in a maintenance group for OAM to be grouped on different spans. A Maintenance Entity (ME) is a maintenance relationship between two MEPs. Additionally, MEG 18 allows for nesting of various groups.

Ethernet OAM mechanisms utilize Continuity Check Messages (CCMs) for end-to-end path protection (EEPP) fault detection. CCMs are polling-based, asynchronous, and bidirectional by way of two independent unidirectional keep alives. Each MEP 12,14 sends a CCM frame periodically to its peer MEP 12,14. All MEPs 12,14 are configured with the same periodic interval, and this is also signaled in the frame for verification. Each MEP 12,14 expects to receive a CCM frame by the end of that periodic interval. Non-receipt of three consecutive frames results in a fault. This fault is indicated in Remote Defect Indication (RDI) bit of a CCM frame sent to a peer. This is useful for one-way fault conditions.

An MEP exits the fault state only after receiving three consecutive CCM frames each at the specified interval. Additionally, the CCM can detect misconnections by comparing MEG and MEP identifiers (ID) from the frame with configured values. CCMs can be used per VLAN per MEG level. Each CCM is sent at the highest priority and is ineligible for discard. For scaling purposes of CCM processing, some level of hardware support is typically utilized. Note, MIPs 16 conventionally do not process CCM frames, but rather simply forward them along based on frame forwarding criteria in the path (i.e., VLAN swap for VLAN cross-connects, destination MAC plus VLAN based forwarding for bridge path).

CCMs can be utilized for fault detection in ring-based Ethernet topologies. Self-healing Ethernet topologies are disclosed in commonly assigned U.S. patent application Ser. No. 10/855,596 filed Sep. 14, 2007 and entitled "SYSTEMS AND METHODS FOR A SELF-HEALING CARRIER ETHERNET TOPOLOGY," the contents of which are incorporated in-full by reference herein. For example, MAC headers of a CCM frame are set using multicast DMAC (destination MAC), such as 01-80-C2-00-00-xx where xx represents MEG level.

Alternatively, the present invention includes a DMAC for ring fault detection as a unicast address of the peer MEP. Advantageously, this prevents interference with IEEE 802.1ag CCM operations and it also works when intermediate nodes are forwarding based on DMAC+VLAN. The source MAC (SMAC) of the CCM frame is the address of the sending MEP, i.e. a nodal MAC address. A stacked VLAN (SVLAN) represents the VLAN path. Note, a VLAN received at a peer MEP could be different due to VLAN swapping used at intermediate points. Each MEP can possibly use different VLAN values to identify and associate to the same CCM instance, and this does not affect the operations of the CCM.

Figure 2:
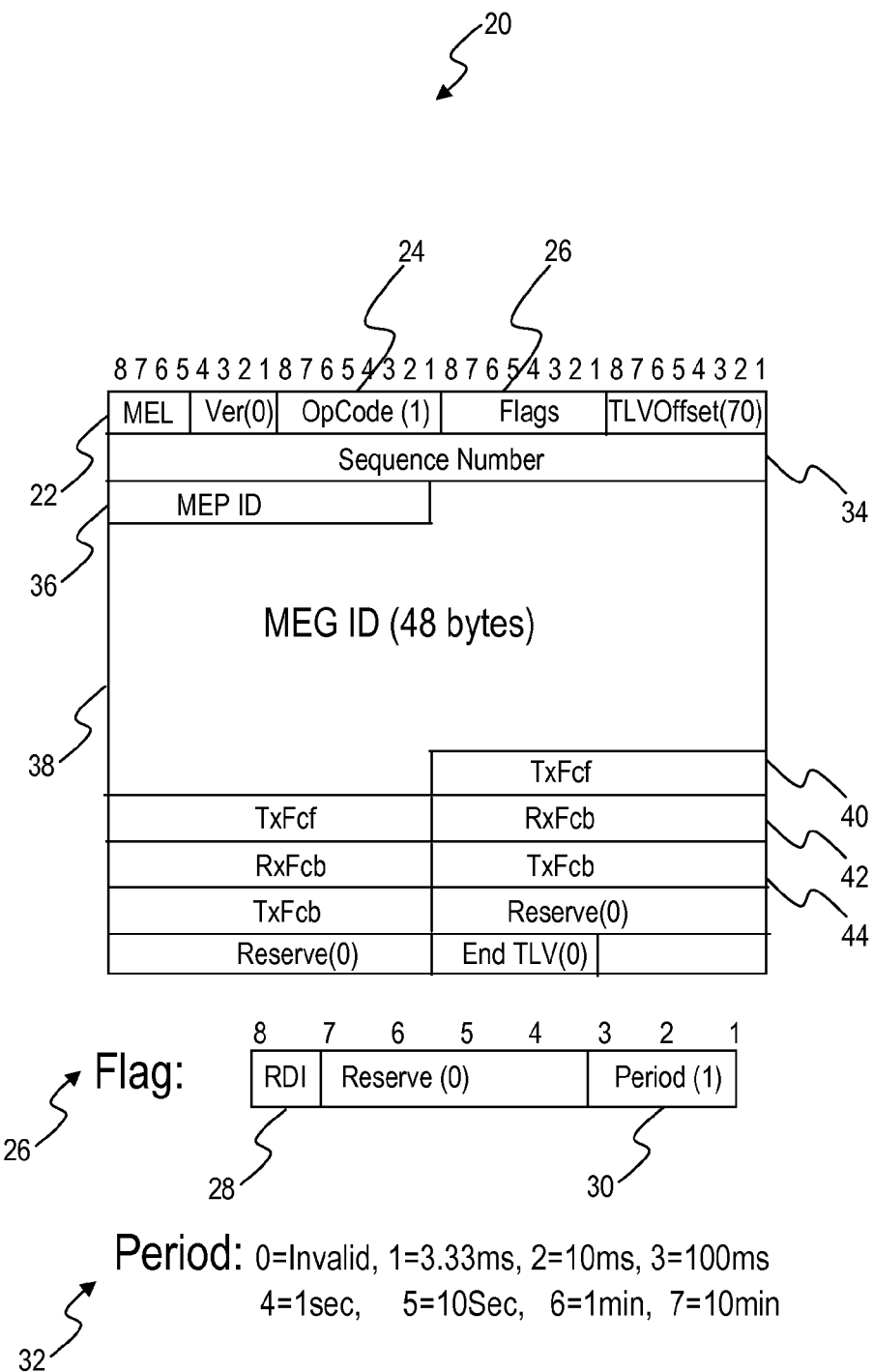
FIG. 2 is a CCM Protocol Data Unit (PDU) for a ring topology according to an exemplary embodiment of the present invention.

Referring to FIG. 2, a CCM Protocol Data Unit (PDU) 20 for a ring topology is illustrated according to an exemplary embodiment of the present invention. A MEG level (MEL) 22 is set according to the MEG level of the CCM. For example, this can be set to 4 to denote a provider level. An OpCode 24 is set to a value of 1 to denote a CCM. Flags 26 are set to indicate an RDI 28. For example, when the receiving MEP detects a fault, the RDI 28 is set in the transmitting CCM. A period 30 is also included in the flags 26. The value of the period 30 corresponds to the periodic interval for CCM frames. The period 30 can be set to various values 32. Typically value 1 of 3.33 ms is utilized for Ethernet protection.

A sequence number 34 is incremented from 0 in each CCM frame. A MEP ID 36 is set according to the sender's MEP ID. A MEG ID 38 is a unique value used for a given ring in a service provider's network. TxFcf 40 represents the number of transmitted CCM frames. RxFcb 42 represents the number of received frames from a peer MEP. TxFcb 44 represents the number of transmitted frames (i.e., TxFcf) received from the peer in the last CCM.

Figure 3:
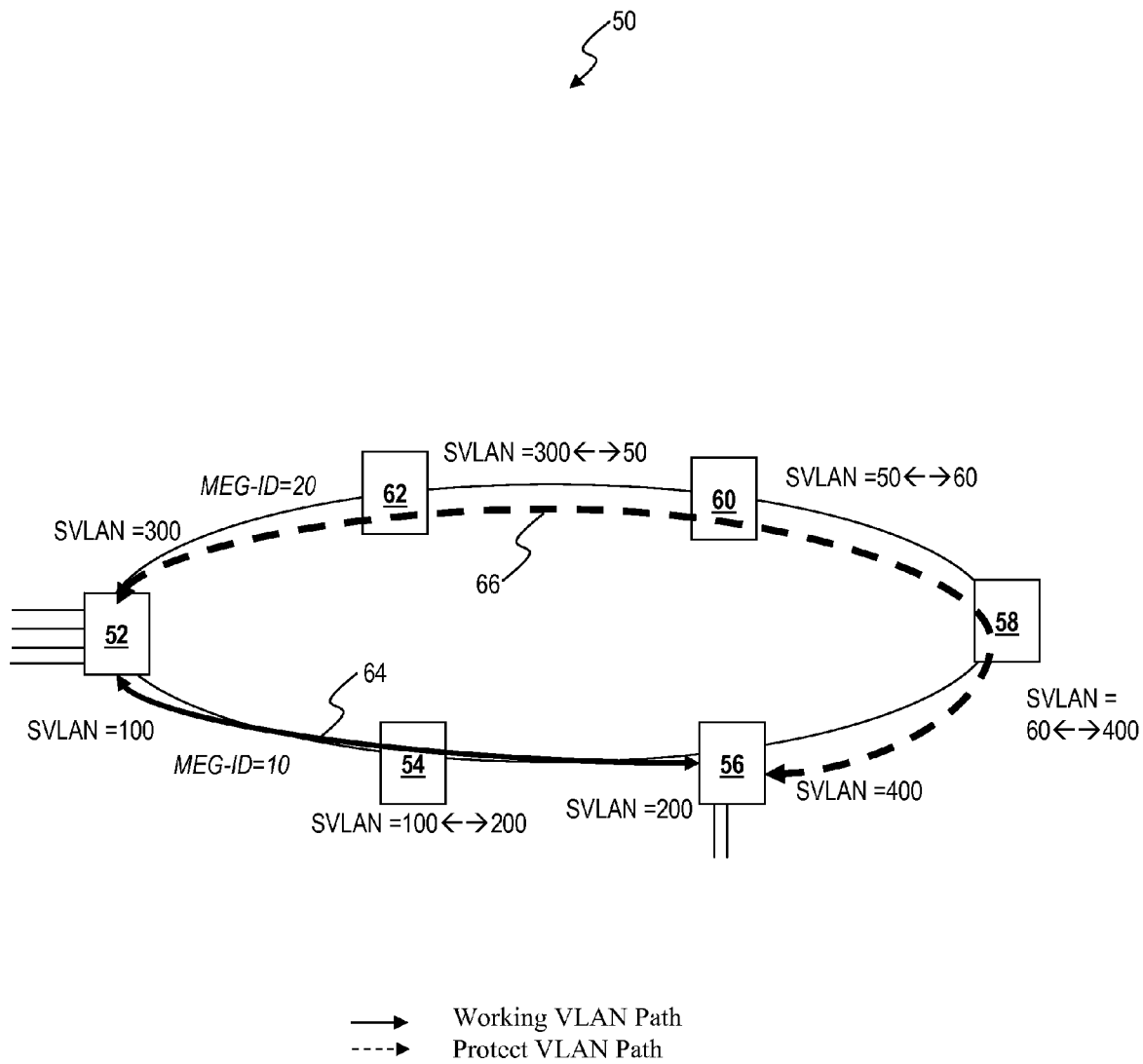
FIG. 3 is an Ethernet ring topology using CCM frames for fault detection according to an exemplary embodiment of the present invention.

Referring to FIG. 3, an Ethernet ring topology 50 illustrates using CCM frames for fault detection according to an exemplary embodiment of the present invention. The ring topology 50 includes multiple Ethernet nodes 52-62. For example, the Ethernet nodes 52-62 can include switches, routers, and the like configured to operate Ethernet OAM mechanisms. In this example, nodes 52,56 are configured as MEPs with the remaining nodes 54,58-62 MIPs.

A working VLAN path 64 is configured between the nodes 52,56 along with a protect VLAN path 66 along a diverse path. The Ethernet ring topology 50 is configured to utilize CCM frames on each VLAN path 64,66, i.e. both nodes 52,56 send CCM frames to each other on the working and protect VLAN paths 64,66. At a period of 3.33 ms time interval (i.e., 300 CCM frames/sec.) on each VLAN path 64,66 in each direction, this utilizes approximately 240 kb/s of bandwidth for OAM per VLAN path 64,66.

In this example, the protect VLAN path is assigned an MEG ID of 20 and the working VLAN path is assigned an MEG ID of 10. Each MIP 54,58-62 is configured with VLAN cross-connects, and each MEP 52,56 is configured with a separate VLAN in each direction (i.e., East and West). For example on the working VLAN path 64, node 52 has an SVLAN of 100 towards node 54. Node 54 has a cross connect between SVLAN 100 to 200. Node 56 has an SVLAN of 200 from node 54. On the protect VLAN path 66, node 52 has an SVLAN of 300 towards node 62. Node 62 has a cross connect between SVLAN 300 to 50, node 60 has a cross connect between SVLAN 50 to 60, and node 58 has a cross connect between SVLAN 60 to 400. Node 56 has an SVLAN of 400 from node 58.

Loss of consecutive CCM frames received in 3.5 times the interval denotes a fault. For example, if node 56 stops receiving CCM frames from node 52 on the working VLAN path 64, then a fault has occurred from node 52 to node 56 on the VLAN path 64. If there is a bidirectional fault, node 52 detects the loss of consecutive CCM frames as well. For a unidirectional fault, node 52 detects the fault by virtue of receiving CCM frames with the RDI bit set. Optionally, the present invention can utilize ITU-T Recommendation G.8031/Y.1342 Ethernet Protection Switching. Note, G.8031 does not specify fault detection, but the fault detection mechanisms presented herein can be utilized to trigger protection switching.

In the Ethernet ring topology 50, a user must configured CCMs at the endpoints of the VLAN paths 64,66 and MEPs individually for both working and protect. For example, various parameters must be set including SVLAN, Peer's SVLAN (for information purposes only), Peer MEP's MAC address, MEG ID unique for each VLAN path but identical at both MEPs, MEP IDs—own and peer, MEG level (default=4), period (default=3.33 ms, can allow 10 ms if slower switchover is tolerable), reversion related parameter—enabled/disabled, time to wait, etc., hold-off timer to allow for lower layer fault recovery (e.g., Link Aggregation Group (LAG)), and the like.

The CCM frames are transmitted by the MEP sending the CCM frame over a VLAN path at configured periodic intervals. The RDI bit is set to signal a local fault detection. In an exemplary embodiment of the present invention, the CCM frames are received as a unicast MAC address plus an Ethertype beyond the S-Tag is used to recognize the CCM as a CFM frame to deliver it to the control plane. The VLAN tag is used to identify the MEG instance.

To detect misconfiguration, miswiring, etc., verification is done, such as MEG ID level with a lower level indicating an error, MEG IDs with a mismatch identifying an error, MEP IDs which are verified against a configured peer's MEP ID and a mismatch is an error, period with a mismatch indicating an unexpected period error. The error detection or no frame from a peer in 3.5 times the period denotes a fault. A single frame without an RDI can clear a remote defect condition. Optionally, an out-of-sequence (through sequence number verification) can indicate a service degradation fault.

These mechanisms are fast (sub-15 ms) and simple. They provide per provider-VLAN path connectivity check. Also, many customer VLAN paths can be protected by tunneling them into a SVLAN. In a best case scenario, each SVLAN path can represent a nodal path to each destination node. These mechanisms can detect misconfigurations, misconnections, etc. They do not depend on lower layer fault detection mechanisms. Slower polling can be used to improve scalability, and no involvement from MIPs is required.

However, these mechanisms are expensive in terms of bandwidth, hardware processing, and the like. Further, scalability is an issue. If only one SVLAN can be used to identify a VLAN path between two nodes, then the number of CCM sessions and frames grows as the paths scale. For example, there are multiple SVLANs that terminate between nodes 52,56.

Figure 4:
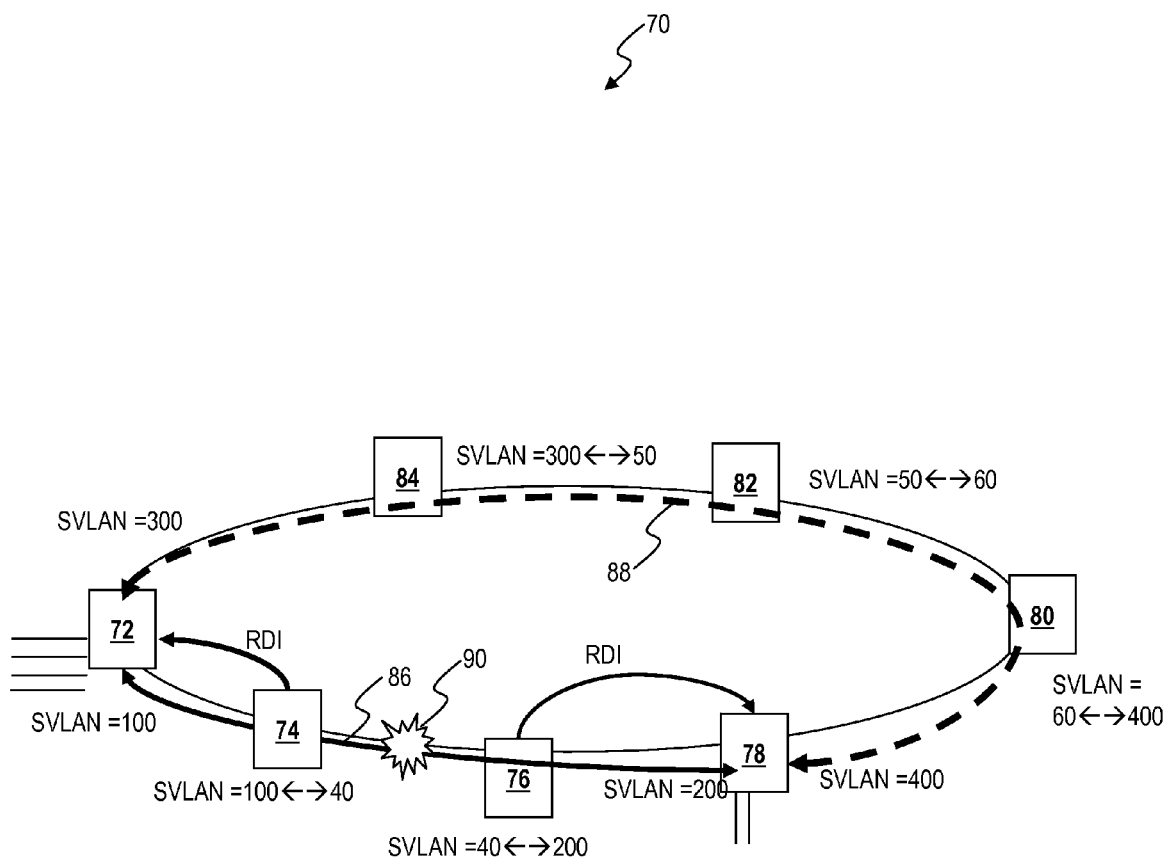
FIG. 4 is an Ethernet ring topology using MIP RDI-based frames for fault detection according to an exemplary embodiment of the present invention.

Referring to FIG. 4, an Ethernet ring topology 70 illustrates using MIP RDI-based frames for fault detection according to an exemplary embodiment of the present invention. The ring topology 70 includes multiple Ethernet nodes 72-84. For example, the Ethernet nodes 72-84 can include switches, routers, and the like configured to operate Ethernet OAM mechanisms. In this example, nodes 72,78 are configured as MEPs with the remaining nodes 74-76,80-84 configured as MIPs. Additionally, a working VLAN path 86 is configured between node 72 and node 78, and a protect VLAN path 88 is configured on a diverse path.

In this example on the working VLAN path 86, node 72 has an SVLAN of 100 towards node 74. Node 74 has a cross connect between SVLAN 100 to 40, and node 76 has a cross connect between SVLAN 40 to 200. Node 78 has an SVLAN of 200 from node 76. On the protect VLAN path 88, node 72 has an SVLAN of 300 towards node 84. Node 84 has a cross connect between SVLAN 300 to 50, node 82 has a cross connect between SVLAN 50 to 60, and node 80 has a cross connect between SVLAN 60 to 400. Node 78 has an SVLAN of 400 from node 80.

In this exemplary embodiment for fault detection, polling-based CCMs are not used at MEPs 72,78. Instead, unsolicited CCM frames with RDI indication are used. Here, MIPs generate CCM frames with RDI bit set when a local fault is detected. This could be based upon a local link failure, operator level CCM frames between two MIPs, and the like.

At each fault-detecting MIP 74-76,80-84, all VLAN cross-connects that are mapped on to a failed port are used to generate CCM-RDI frames in the reverse direction, such as, for example in FIG. 4, node 74 to node 72 on SVLAN 100 and node 76 to node 78 on SVLAN 200 for a fault 86. Afterwards, RDI frames are sent periodically as determined by the configured interval while the fault exists. Intervening MIPs (i.e., between the originating MIP and the MEP) do not process the CCM-RDI.

The MEP receiving the RDI marks the VLAN path in the fault state and can fail over to the protected path 88. The fault condition is cleared when an MEP receives a CCM-RDI frame with RDI bit cleared in the flag. Also, MIPs can be configured to continue to generate CCM frames with the RDI bit cleared for a short period to ensure delivery of the fault clear condition. Reversion from the protect path 88 is based on predetermined policy.

Figure 5:
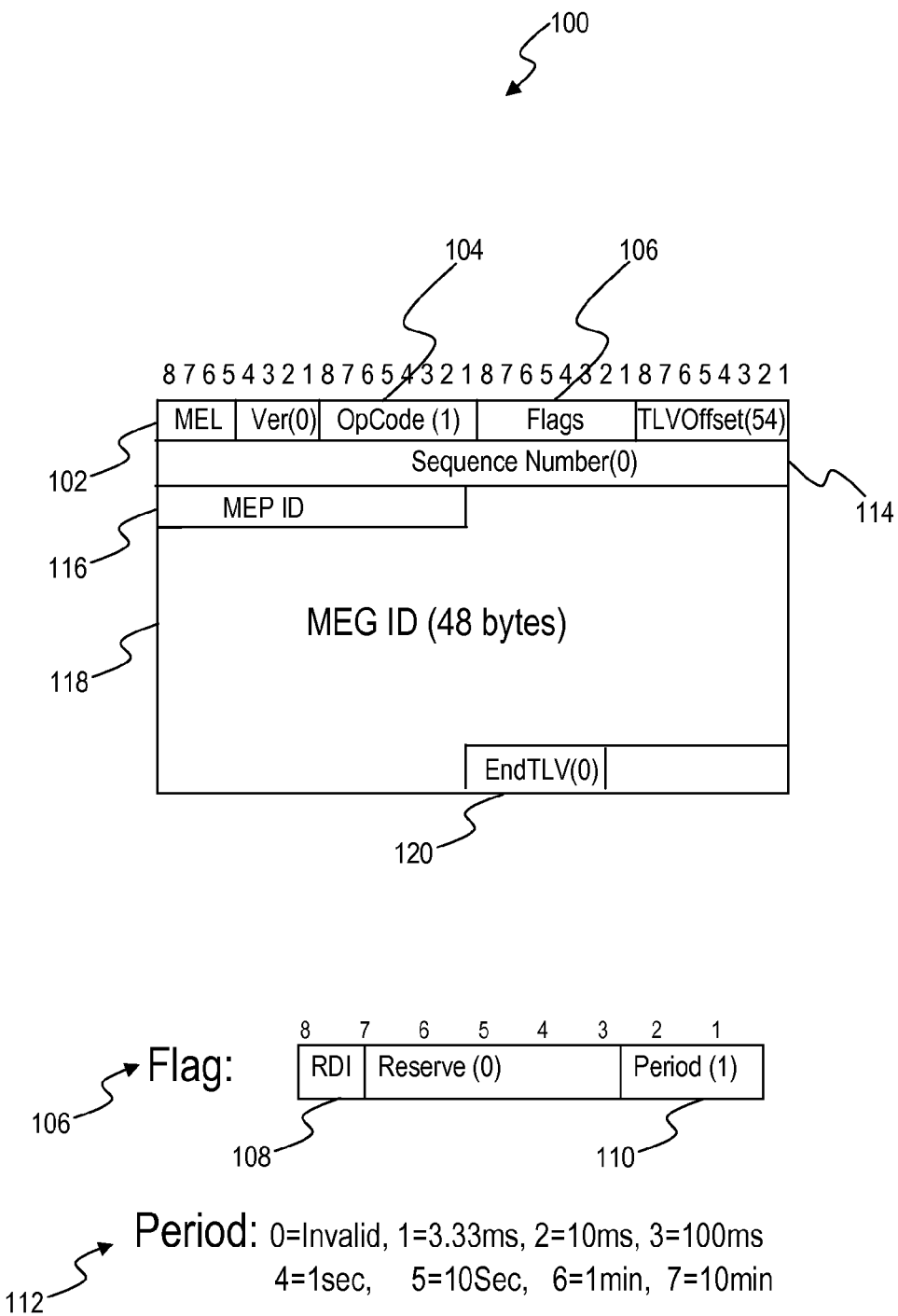
FIG. 5 is a CCM unsolicited RDI PDU according to an exemplary embodiment of the present invention.

Referring to FIG. 5, a CCM unsolicited RDI PDU 100 is illustrated according to an exemplary embodiment of the present invention. A MEG level (MEL) 102 is set according to the MEG level of the CCM. For example, this can be set to 4 to denote a provider level. An OpCode 104 is set to a value of 1 to denote a CCM. Flags 106 are set to indicate an RDI 108. For example, when the receiving MEP detects a fault, the RDI 108 is set in the transmitting CCM. A period 110 is also included in the flags 106. The value of the period 110 corresponds to the periodic interval for CCM frames. The period 110 can be set to various values 112. Typically value 1 of 3.33 ms is utilized for Ethernet protection.

A sequence number 114 is incremented from 0 in each CCM frame. A MEP ID 116 is set to the MIP since the MIP is acting as a proxy for the sender's MEP ID. A MEG ID 118 is a unique value used for a given ring in a service provider's network. A TLV 120 is optionally included with information about the reporting MIP, such as the unicast MAC address and the like.

For CCM unsolicited RDI-based fault detection, each MIP 74-76,80-84 and MEP 72,78 is required to be configured for MIP CCM generation. At the MEPs 72,78, the configuration is the same as for the polling-based mechanisms except polling is disabled. For a given VLAN cross-connect, the MIP 74-76,80-84 is configured with information of both the MEP 72,78 endpoints (since it is proxying for both). For example, the MIPs 74-76,80-84 for each SVLAN cross-connect configuration for the reverse direction, the MEG ID, MEG ID level, proxy MEP IP (source MEP ID), unicast MAC address of the target MEP, and period are specified. All of the MIPs 74-76,80-84 and MEPs 72,78 are configured with identical MEG ID, MEL, and period.

Alternatively, the MIP 74-76,80-84 can be configured to rapid fire CCM frames with RDI information whenever a fault event occurs (i.e., set or clear fault). In the case of a fault, after an initial rapid fire, an exponential backoff interval can be used while the fault exists.

Advantageously, unsolicited RDI-based fault detection is highly scalable due to the elimination of CCM polling. Also, fault detection can be much faster when local link failure detection mechanisms are used. The unsolicited RDI-based fault detection requires MIP participation and requires configuration. The arrival of RDI CCMs at two MEP endpoints can be asynchronous, accordingly, a switch to a protection path can be coordinated to avoid potential traffic loss.

Figure 6:
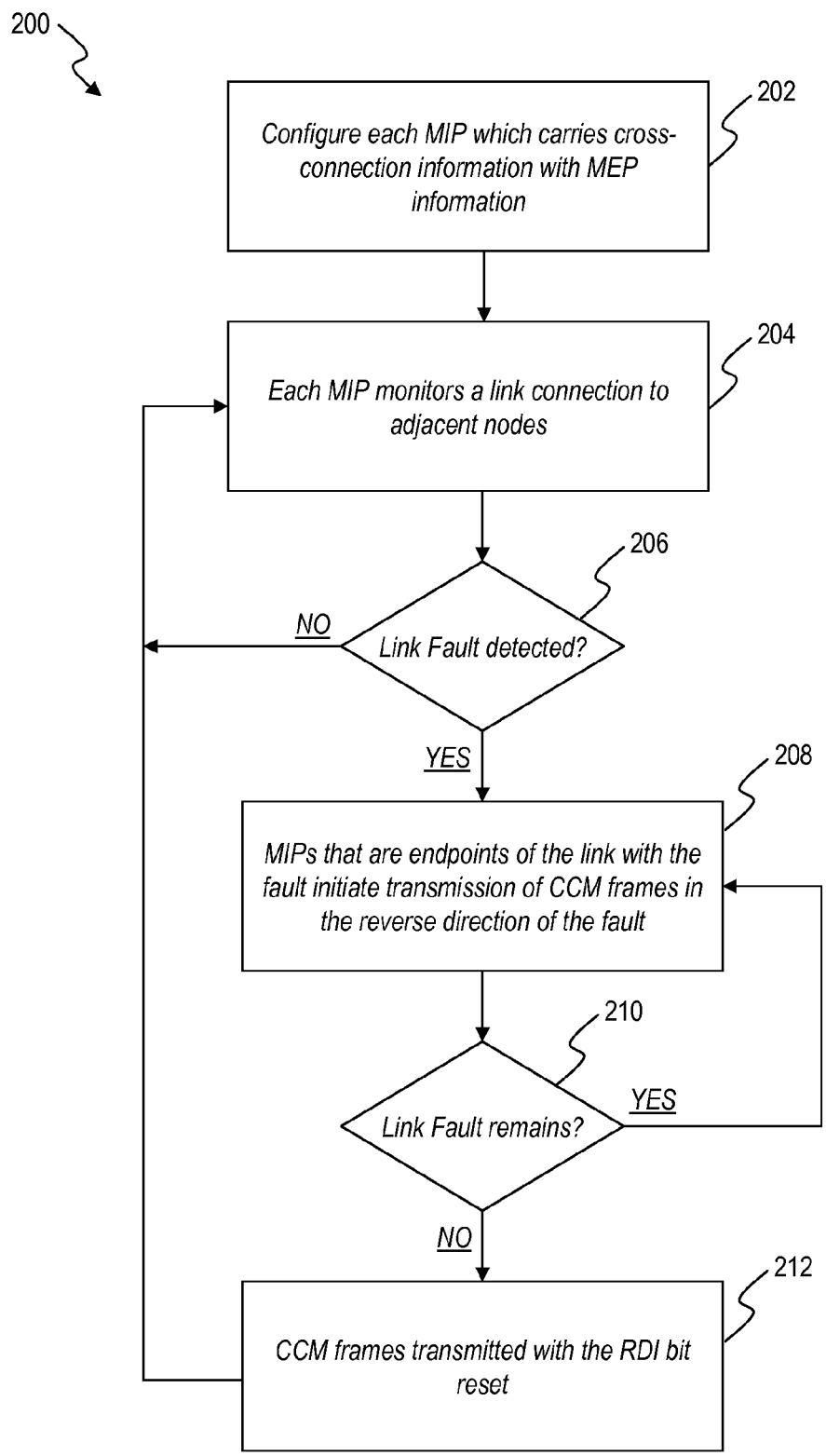
FIG. 6 is a flowchart depicting an unsolicited RDI-based fault detection according to an exemplary embodiment of the present invention.

Referring to FIG. 6, a flowchart is illustrated depicting an unsolicited RDI-based fault detection 200 according to an exemplary embodiment of the present invention. Each MIP that carries cross-connection information is configured with MEP information (step 202). A cross-connect includes of a pair of cross-connect halves, i.e. an ingress cross-connect and an egress cross-connect. The ingress cross-connect is configured with head-end MEP information while egress cross-connect is configured with tail-end MEP information. The information configured, for example, typically includes MAC address of the MEP, MEG ID and MEP ID, which uniquely identifies the Ethernet path.

Each MIP monitors a link connection with adjacent nodes (i.e., head end facing and tail end facing) (step 204). The link monitoring can utilize local port failures, IEEE 802.3ah mechanisms, or operator-level CCM, and the like depending on the network topologies. IEEE 802.3ah-2004 includes specifications for Ethernet in the first mile, and the contents of which are incorporated in-full by reference herein. IEEE 802.3ah mechanisms provide local link fault detection mechanisms. The link monitoring is continuously checking for any detected link faults (step 206). If no link faults are detected, then the link monitoring continues (step 204).

When a local-link-fault is detected, the two MIPs that are endpoints of the link with the fault initiate a transmission of CCM frames in the reverse direction (of the fault) to the MEP (step 208). For example, when a fault is detected on the link associated with an egress cross-connect, an MIP sends a CCM frame to the head-end MEP. Similarly, an MIP associated with the ingress cross-connect (on the other side of the link fault), initiates CCM frame transmission to the tail-end MEP. The CCM frame transmitted is directed to the unicast MAC address of the MEP, with the source MAC address of the other MEP. The RDI bit is set in the flag, MEG ID and MEP ID and other information is filled in the CCM frame as described in the Y.1731 minus the statistics fields. The MIPs are in some sense behaving as the proxy for the respective MEPs. Advantageously, these frame formats are intentionally used to utilize portions of legacy CFM methodologies to simplify its implementation.

The unsolicited RDI-based fault detection 200 checks to see if the link fault remains (step 210). If so, the frame transmission continues while the fault remains (step 208). When the fault is cleared, CCM frames are sent with RDI bit reset in the flag field (step 212). Such frames are continually dispatched for a period of time in order to make sure that MEPs have received the fault clear notifications. The interval used for such CCM frame does not have to be a short constant value since a receipt of a single CCM frame with RDI bit set marks the reverse Ethernet Path to be in the fault state at the MEP. In order to reduce CCM traffic load but at the same time ensure the high probability of delivery, several dispatch discipline can be used. They could be an initial rapid fire dispatch for a short interval when a change of event occurs and in case of fault detection the dispatch interval could then be elongated in an exponential backoff manner to slow down the dispatch of CCM frames with RDI bit set.

Figure 7:
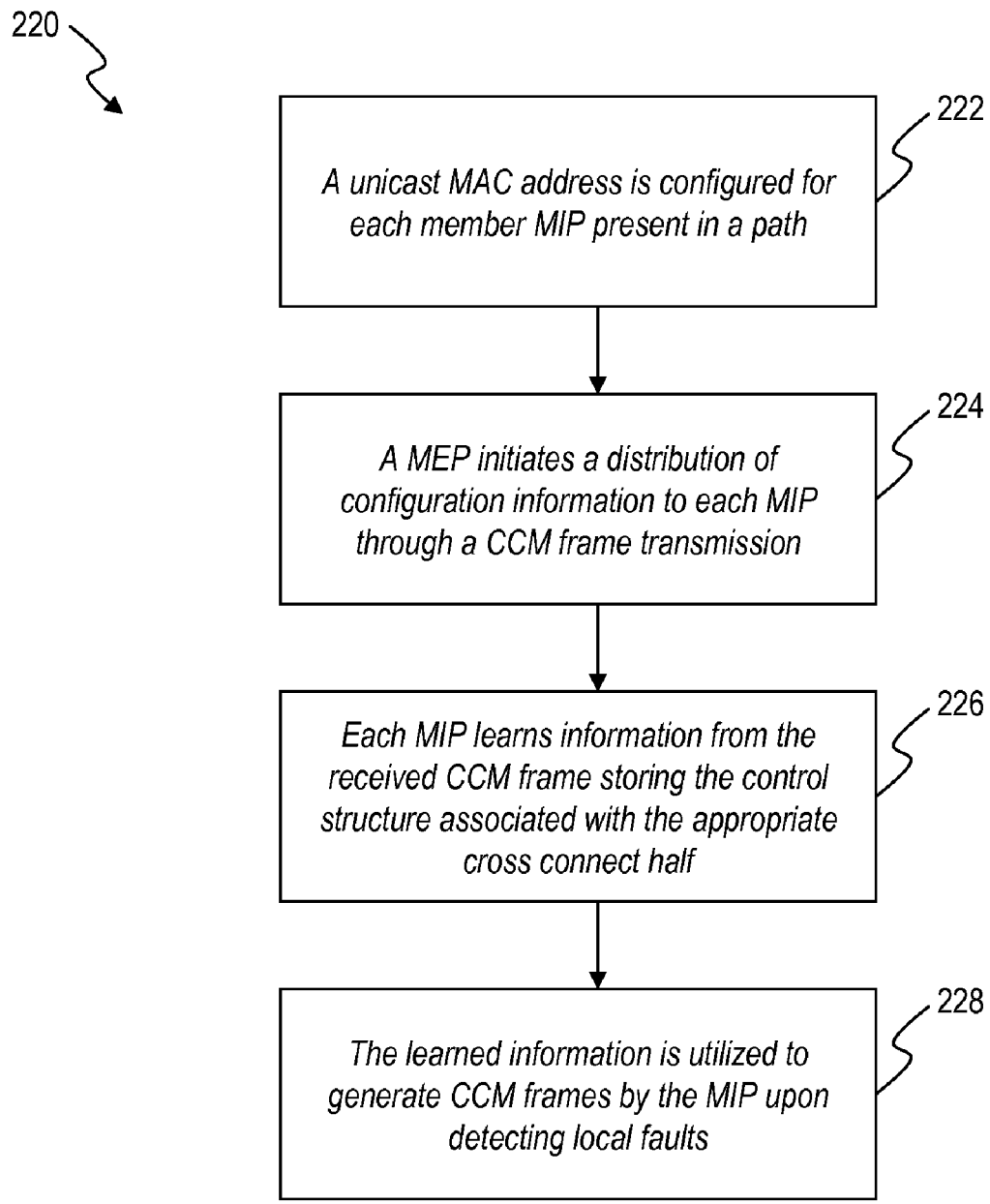
FIG. 7 is a flowchart depicting distribution of configuration information from a MEP to MIPs present on a given Ethernet path via a control protocol according to an exemplary embodiment of the present invention.

Referring to FIG. 7, a flowchart is illustrated depicting distribution 220 of configuration information from a MEP to MIPs present on a given Ethernet path via a control protocol according to an exemplary embodiment of the present invention. First, a user configures a unicast MAC address of each member MIP present in the path (step 222). The MEP then initiates a distribution of configuration information to each MIP by sending a CCM frame that contains this information (step 224). The MIP learns information from the received CCM frame and stores in a control structure associated with the appropriate cross-connect half (step 226). This information is subsequently used to generate the CCM frame as described above when the local link fault is detected (step 228).

Figure 8:
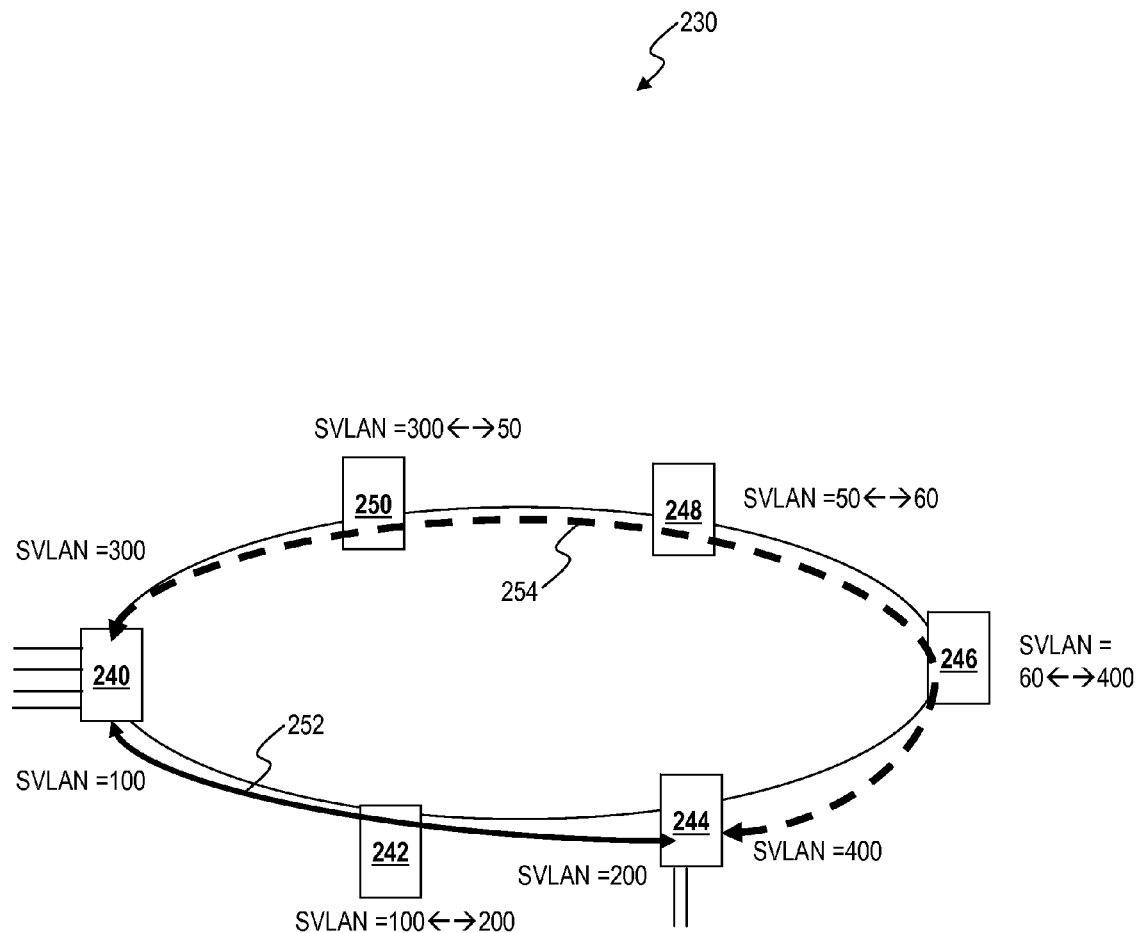
FIG. 8 is an Ethernet ring topology using trunk fault detection based on CCMs according to an exemplary embodiment of the present invention.

Referring to FIG. 8, an Ethernet ring topology 230 illustrates using trunk fault detection based on CCMs according to an exemplary embodiment of the present invention. The ring topology 230 includes multiple Ethernet nodes 240-250. For example, the Ethernet nodes 240-250 can include switches, routers, and the like configured to operate Ethernet OAM mechanisms. In this example, nodes 240,244 are configured as MEPs with the remaining nodes 242,246-250 configured as MIPs. Additionally, a working VLAN path 252 is configured between node 240 and node 244, and a protect VLAN path 254 is configured on a diverse path.

In this example on the working VLAN path 252, node 240 has an SVLAN of 100 towards node 242. Node 242 has a cross connect between SVLAN 100 to 200, and node 244 has an SVLAN of 200 from node 242. On the protect VLAN path 254, node 240 has an SVLAN of 300 towards node 250. Node 250 has a cross connect between SVLAN 300 to 50, node 248 has a cross connect between SVLAN 50 to 60, and node 246 has a cross connect between SVLAN 60 to 400. Node 244 has an SVLAN of 400 from node 246.

Using trunk fault detection based on CCMs, an SVLAN represents a nodal connection between two nodes. Each node has exactly N-1 SVLAN paths in a ring network with N nodes. For example, in the Ethernet ring topology 230, node 240 has five SVLANs, each to different nodes 242-250. Also, there is another set of five SVLANs used as protect paths in a counter-rotating direction around the ring 230. There are two possible tunneling schemes including a Nodal SVLAN and a MAC-in-MAC. In the Nodal SVLAN, all Ethernet flows (tagged (C/S or both), untagged) ingressing from one node and egressing at another node are mapped to a nodal SVLAN trunk. In MAC-in-MAC, all Ethernet flows are mapped to a MAC tunnel.

For the Nodal SVLAN tunneling scheme, an ingress MEP pushes a nodal SVLAN tag to Ethernet frames before dispatching to the PSN. It is possible that an SVLAN tag was already pushed on some other criteria at the same node. The SVLAN tag pushed for the operation must be the one that an egress MEP recognizes since this tag is invisible to intermediate MIP nodes. The MIP nodes forward based on the outer tag and the presence of three VLAN tags is transparent. The egress MEP keys the nodal SVLAN to recognize the tunnel path and pops the label. The rest of the frame processing operations are done based on inner tag(s).

For the MAC-in-MAC tunneling scheme, the ingress MEP prepends a MAC-in-MAC header with the DMAC of the egress MEP, SMAC (source MAC) of his own MAC address, B-VID (backbone VLAN ID) that represents the tunnel and an I-SID (service instance information) derived from a S-TAG (Service VLAN Tag). The CCM fault detection mechanisms work as described here, i.e. unicast MAC address destination instead of a reserved group MAC address. When a fault occurs, all the ingress traffic at the head end is diverted to a protect path.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for scalable and rapid Ethernet fault detection, comprising:
   configuring a Maintenance Intermediate Point with Maintenance Entity End Point information, wherein a Maintenance Entity End Point sources and sinks Carrier Ethernet Connectivity Fault Management frames and the Maintenance Intermediate Point processes and forwards Carrier Ethernet Connectivity Fault Management frames, and wherein the Maintenance Entity End Point is configured with Carrier Ethernet Continuity Check Message polling disabled;
   monitoring at the Maintenance Intermediate Point for a link fault on a link connection to adjacent nodes;
   initiating a transmission from the Maintenance Intermediate Point of a Continuity Check Message with a Remote Defect Indication set in a reverse direction of the link fault to the Maintenance Entity End Point responsive to detecting the link fault, wherein the Maintenance Intermediate Point was previously operable to receive, process, and forward, but not generate, Continuity Check Messages; and
   initiating a transmission from the Maintenance Intermediate Point of a Continuity Check Message with the Remote Defect Indication reset responsive to clearing of the link fault.

2. The method for scalable and rapid Ethernet fault detection of claim 1, further comprising continuing transmission of the Continuity Check Message with the Remote Defect Indication set in the reverse direction of the link fault to the Maintenance Entity End Point while the link fault remains.

3. The method for scalable and rapid Ethernet fault detection of claim 1, further comprising continuing transmission of the Continuity Check Message with the Remote Defect Indication reset after clearing of the fault for a period of time.

4. The method for scalable and rapid Ethernet fault detection of claim 1, further comprising:
   configuring a unicast Media Access Control address for the Maintenance Intermediate Point;
   initiating a distribution of configuration information to the Maintenance Intermediate Point through a Continuity Check Message;
   storing the configuration information at the Maintenance Intermediate Point; and
   utilizing the configuration information for initiating Continuity Check Messages.

5. The method for scalable and rapid Ethernet fault detection of claim 1, wherein the link fault is detected by the Maintenance Intermediate Point through one of local port failure detection, IEEE 802.3ah mechanisms, operator-level Continuity Check Messages, and a combination thereof.

6. The method for scalable and rapid Ethernet fault detection of claim 1, further comprising utilizing 1:1 Ethernet Protection Switching to switch to a diverse path at the Maintenance Entity End Point responsive to detecting the link fault.

7. An Ethernet path configured for scalable and rapid Ethernet fault detection, comprising:
   a first Maintenance Entity End Point;
   one or more Maintenance Intermediate Points interconnected to the first Maintenance Entity End Point; and
   a second Maintenance Entity End Point connected to the first Maintenance Entity End Point through the one or more Maintenance Intermediate Points,
   wherein the first and second Maintenance Entity End Points source and sink Carrier Ethernet Connectivity Fault Management frames and the one or more Maintenance Intermediate Point processes and forwards Carrier Ethernet Connectivity Fault Management frames, and
   wherein each of the first Maintenance Entity End Point and the second Maintenance Entity End Point are configured with Carrier Ethernet Continuity Check Message polling disabled;
   wherein the one or more Maintenance Intermediate Points are configured with Maintenance Entity End Point information and are selectively configured for unsolicited Continuity Check Message generation to the first Maintenance End Point and the second Maintenance End Point responsive to detecting a local link fault, wherein the one or more Maintenance Intermediate Points are otherwise configured for receiving, processing, and forwarding, but not generating, Continuity Check Messages;
   wherein the unsolicited Continuity Check Message generation comprises:
   a transmission of a Continuity Check Message with a Remote Defect Indication set in a reverse direction of the local link fault to one of the first Maintenance Entity End Point and second Maintenance Entity End Point responsive to detecting the local link fault; and
   a transmission of a Continuity Check Message with the Remote Defect Indication reset responsive to clearing of the local link fault.

8. The Ethernet path configured for scalable and rapid Ethernet fault detection of claim 7, wherein the unsolicited Continuity Check Message generation further comprises a continuing transmission of the Continuity Check Message with the Remote Defect Indication set in the reverse direction of the local link fault to one of the first Maintenance Entity End Point and second Maintenance Entity End Point while the local link fault remains.

9. The Ethernet path configured for scalable and rapid Ethernet fault detection of claim 7, wherein the unsolicited Continuity Check Message generation further comprises a continuing transmission of the Continuity Check Message with the Remote Defect Indication reset after clearing of the fault for a period of time.

10. The Ethernet path configured for scalable and rapid Ethernet fault detection of claim 7, wherein each of the one or more Maintenance Intermediate Points are configured with a unicast Media Access Control address for the first Maintenance Entity End Point and the second Maintenance Entity End Point;
    wherein the first Maintenance Entity End Point and the second Maintenance Entity End Point are configured to distribute configuration information to each of the one or more Maintenance Intermediate Points through a Continuity Check Message; and
    wherein each of the one or more Maintenance Intermediate Points are configured to store the configuration information and utilize the configuration information for initiating Continuity Check Messages.

11. The Ethernet path configured for scalable and rapid Ethernet fault detection of claim 7, wherein the local link fault is detected by a Maintenance Intermediate Point of the one or more Maintenance Intermediate Points through one of local port failure detection, IEEE 802.3ah mechanisms, operator-level Continuity Check Messages, and a combination thereof.

12. The Ethernet path configured for scalable and rapid Ethernet fault detection of claim 7, further comprising:
a diverse interconnection between the first Maintenance Entity End Point and the second Maintenance Entity End Point;
wherein the diverse interconnection comprises one of a second set of one or more Maintenance Intermediate Points interconnected between the first Maintenance Entity End Point and the second Maintenance Entity End Point and a direct connection between the first Maintenance Entity End Point and the second Maintenance Entity End Point; and
wherein the first Maintenance Entity End Point and the second Maintenance Entity End Point are configured to utilize Ethernet Protection Switching to switch to the diverse interconnection responsive to detecting the local link fault.

13. An Ethernet ring topology configured for scalable and rapid Ethernet fault detection, comprising:
a first Maintenance Entity End Point;
a first set of one or more Maintenance Intermediate Points interconnected to the first Maintenance Entity End Point;
a second Maintenance Entity End Point connected to the first Maintenance Entity End Point through the first set of one or more Maintenance Intermediate Points,
wherein the first and second Maintenance Entity End Points source and sink Carrier Ethernet Connectivity Fault Management frames and the first set of one or more Maintenance Intermediate Point processes and forwards Carrier Ethernet Connectivity Fault Management frames, and
wherein each of the first Maintenance Entity End Point and the second Maintenance Entity End Point are configured with Carrier Ethernet Continuity Check Message polling disabled; and
a second set of one or more Maintenance Intermediate Points interconnected to the first Maintenance Entity End Point and the second Maintenance Entity End Point through a diverse path;
wherein the first set of one or more Maintenance Intermediate Points and the second set of one or more Maintenance Intermediate Points are configured with Maintenance Entity End Point information and are configured for unsolicited Continuity Check Message generation to the first Maintenance End Point and the second Maintenance End Point responsive to detecting a local link fault, wherein the first set of one or more Maintenance Intermediate Points and the second set of one or more Maintenance Intermediate Points are otherwise configured for receiving, processing, and forwarding, but not generating, Continuity Check Messages;
wherein the unsolicited Continuity Check Message generation comprises:
a transmission of a Continuity Check Message with a Remote Defect Indication set in a reverse direction of the local link fault to one of the first Maintenance Entity End Point and second Maintenance Entity End Point responsive to detecting the local link fault; and
a transmission of a Continuity Check Message with the Remote Defect Indication reset responsive to clearing of the local link fault.

14. The Ethernet ring topology configured for scalable and rapid Ethernet fault detection of claim 13, wherein the unsolicited Continuity Check Message generation further comprises a continuing transmission of the Continuity Check Message with the Remote Defect Indication set in the reverse direction of the local link fault to one of the first Maintenance Entity End Point and second Maintenance Entity End Point while the local link fault remains.

15. The Ethernet ring topology configured for scalable and rapid Ethernet fault detection of claim 13, wherein the unsolicited Continuity Check Message generation further comprises a continuing transmission of the Continuity Check Message with the Remote Defect Indication reset after clearing of the fault for a period of time.

16. The Ethernet ring topology configured for scalable and rapid Ethernet fault detection of claim 13, wherein each of the first set of one or more Maintenance Intermediate Points and the second set of one or more Maintenance Intermediate Points are configured with a unicast Media Access Control address for the first Maintenance Entity End Point and the second Maintenance Entity End Point;
wherein the first Maintenance Entity End Point and the second Maintenance Entity End Point are configured to distribute configuration information to each of the first set of one or more Maintenance Intermediate Points and the second set of one or more Maintenance Intermediate Points through a Continuity Check Message; and
wherein each of the first set of one or more Maintenance Intermediate Points and the second set of one or more Maintenance Intermediate Points are configured to store the configuration information and utilize the configuration information for initiating Continuity Check Messages.

17. The Ethernet ring topology configured for scalable and rapid Ethernet fault detection of claim 13, wherein the local link fault is detected by a Maintenance Intermediate Point of the first set of one or more Maintenance Intermediate Points and the second set of one or more Maintenance Intermediate Points through one of local port failure detection, IEEE 802.3ah mechanisms, operator-level Continuity Check Messages, and a combination thereof.

18. The Ethernet ring topology configured for scalable and rapid Ethernet fault detection of claim 13, wherein the first Maintenance Entity End Point and the second Maintenance Entity End Point are configured to utilize 1:1 Ethernet Protection Switching to switch between the first set of one or more Maintenance Intermediate Points and the second set of Maintenance Intermediate Points responsive to detecting the local link fault.

* * * * *